United States Patent [19]

Graas

[11] Patent Number: 4,779,656
[45] Date of Patent: Oct. 25, 1988

[54] PNEUMATIC TIRE

[75] Inventor: Maurice Graas, Luxembourg City, Luxembourg

[73] Assignee: The Goodyear Tire & Rubber Company, Akron, Ohio

[21] Appl. No.: 27,908

[22] Filed: Mar. 19, 1987

Related U.S. Application Data

[63] Continuation-in-part of Ser. No. 902,891, Sep. 2, 1986, abandoned.

[51] Int. Cl.$^4$ ............................................. B60C 11/00
[52] U.S. Cl. ................................................ 152/209 R
[58] Field of Search ....................... 152/209 R, 209 D; D12/140, 142, 151

[56]  References Cited

U.S. PATENT DOCUMENTS

| | | | |
|---|---|---|---|
| D. 268,492 | 4/1983 | Grenie | 152/209 R |
| 3,199,567 | 8/1965 | Kunz et al. | 152/209 R |
| 3,674,077 | 7/1972 | Verdier | 152/209 R |
| 3,698,462 | 10/1972 | Jacobs | 152/209 R |
| 3,799,231 | 3/1974 | Boileau | 152/209 R |
| 4,416,317 | 11/1983 | Caretta | 152/209 R |
| 4,424,844 | 1/1984 | Fontaine | 152/209 R |
| 4,471,825 | 9/1984 | Kuhn et al. | 152/209 R |
| 4,545,415 | 10/1985 | Lindner et al. | 152/209 R |
| 4,667,718 | 3/1987 | Fontaine | 152/209 D |

FOREIGN PATENT DOCUMENTS 0192911  9/1986  European Pat. Off. .

Primary Examiner—Michael W. Ball
Attorney, Agent, or Firm—R. J. Slattery, III

[57]  ABSTRACT

A pneumatic tire has a tread portion (11) which consists of a plurality of block elements (17) arranged in rows (18) extending laterally across the tread portion. In each row each block element (17A) axially overlaps with at least one adjacent block elment (17B) and (17C). The mutually overlapping portions of the block elements (17) are separated by axially extending blades (26).

Under a circumferential load (L), the block elements distort and the blades close so that adjacent blocks interlock.

10 Claims, 6 Drawing Sheets

PNEUMATIC TIRE

This application is a continuation-in-part of U.S. application Ser. No. 902,891 filed Sept. 2, 1986.

BACKGROUND OF THE INVENTION

This invention relates to pneumatic tires for motor vehicles and particularly to tires for passenger cars.

Vehicle tires having a tread comprising a plurality of block elements are well known. In a typical high performance passenger tire the block elements are arranged in circumferentially extending rows separated by circumferential grooves. In some prior art tires the block elements are also arranged in rows that extend across the tread.

The present invention seeks to provide a high performance tire having a block tire tread pattern and which has an improved wet traction and wet braking properties.

SUMMARY OF THE INVENTION

According to the present invention there is provided a pneumatic tire having a ground contacting tread portion comprising a plurality of block elements which are disposed in rows separated by lateral grooves extending transversely across the tread, characterized in that in each row each block axially overlaps an adjacent block and the mutually overlapping portions of adjacent blocks are separated by substantially axially extending blades, no two of said blades separating adjacent block elements in any row being circumferentially aligned with one another.

As used herein, "axial" and "axially" indicate directions parallel to the axis of rotation of the tire, and "circumferential" or "circumferentially" indicate the directions of rotation of the tire.

Preferably, the lateral grooves each have a linear portion which traverses the circumferential center plane of the tread at an angle of at least 30°. The circumferential center plane of the tire is a plane perpendicular to the axis of rotation of the tire and which is located mid-way between the lateral edges of the tread.

Preferably, each block element is separated from its adjacent block element by two axially off-set, circumferentially extending grooves linked by said axially extending blade. Conveniently, the block elements in each row are arranged so that as each respective row extends transversely across the tread portion, the overlapping portions of adjacent block elements are separated by blades which are located at progressively further circumferential displacements around the tire.

DETAILED DESCRIPTION OF THE INVENTION

Figure 1:
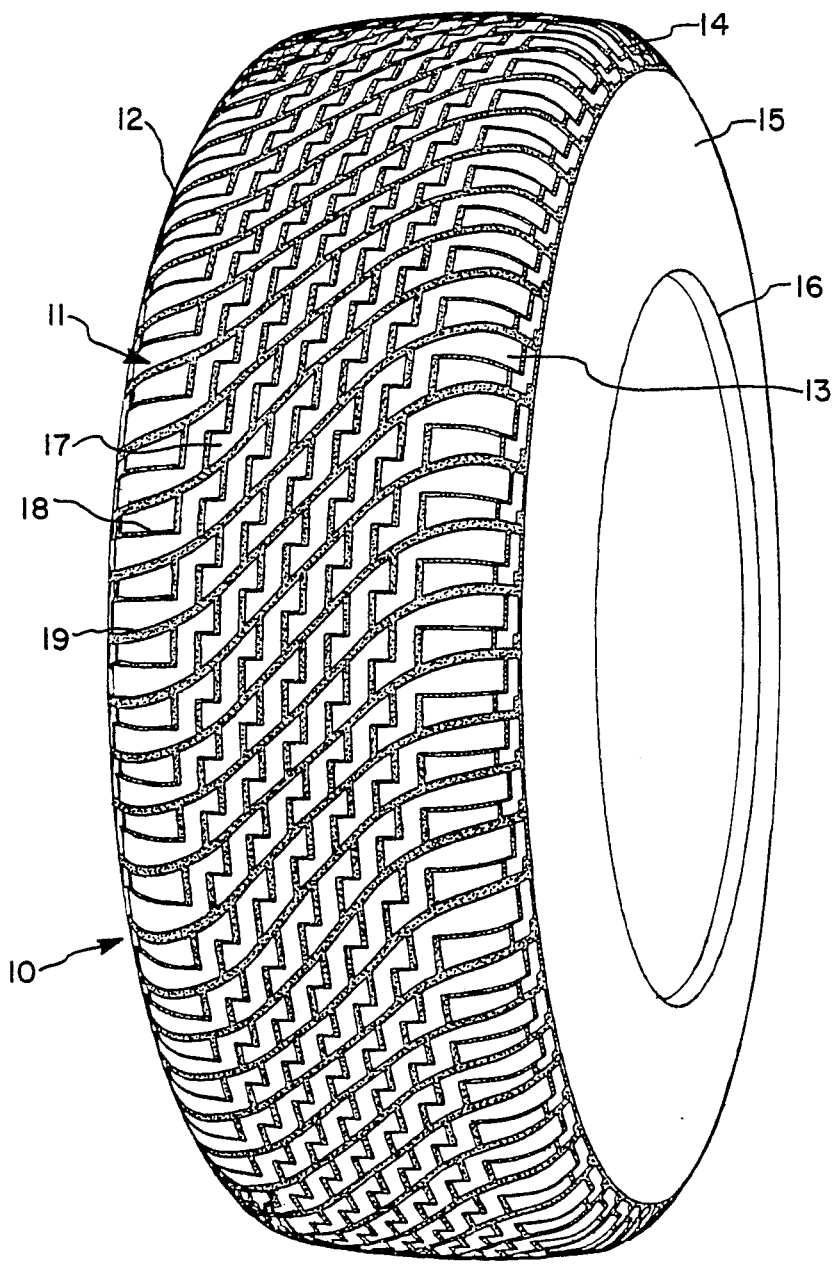
FIG. 1 is a perspective view of a tire according to this invention.

With reference to FIG. 1, there is shown a pneumatic tire 10 for a passenger car which has a radial carcass construction. The tire comprises a ground contacting tread portion 11 having a pair of lateral edges 12,13, each of which is flanked by a shoulder region 14. Each shoulder region 14 extends radially inwardly to a sidewall 15, and each sidewall 15 terminates at its radially inner end in a bead portion 16 utilized for fitting the tire onto a wheel rim.

The tread portion 11 comprises a plurality of block elements 17 which are arranged in rows 18 which extend transversely across the tread portion 11 from one lateral edge 12 to the other lateral edge 13. The lateral edges 12,13 are separated by an axial distance known as the tread width TW. For the purposes of this disclosure, the tread width TW is defined as the greatest axial distance across the tread, when measured from a footprint of the tire, when subjected to a design load and when inflated to a design pressure for said load. The rows 18 of block elements 17 are separated by lateral grooves 19 which extend across the tread portion 11 from one lateral edge 12 to the other lateral edge 13. The lateral grooves 19 are each in the form of an elongated "S" configuration comprising curved portions 21,22 adjacent the lateral edges 12,13 respectively and a linear central portion 23 which links the two curved portions 21,22, the lateral grooves having a width such that they do not close up in a footprint of the tire.

The linear central portion 23 of each lateral groove 18 extends diagonally across the tread portion 11 and makes an angle α with the circumferential center plane M—M of the tire. The angle δ is at least 30° and is preferably in the range of 45° to 50°.

The curved portions 21,22 of each lateral groove extend in circumferential opposite directions and change the angle of orientation of the lateral groove 19 with respect to the center plane M—M so as to increase said angle as the distance from the center plane M—M increases. At each lateral edge 12,13, the curved portions 21,22 of each lateral groove are oriented at an angle β with respect to a plane parallel to the center plane M—M. The angle β should be at least 60° and preferably in the range of 70° to 80°.

While the lateral grooves 19 have been described as being of "S" shaped configuration it will be appreciated that if the linear portion 23 of each groove traversed the tread portion 11 on the opposite bias angle, and if the curved portions 21,22 of each groove were curved in the opposite circumferential directions, then a "Z" shaped configuration would be obtained.

Figure 2:
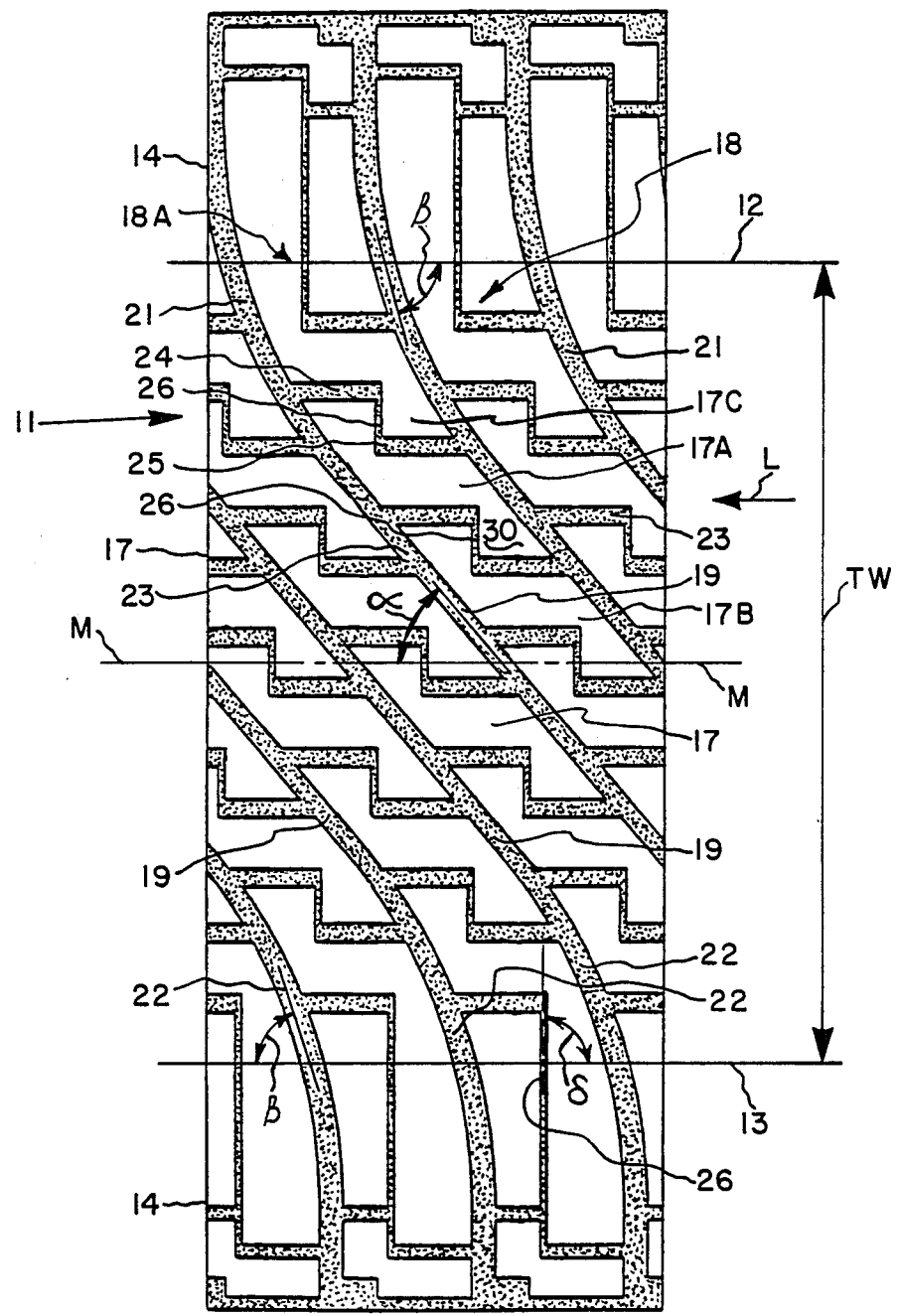
FIG. 2 is a fragmentary plan view of the tread portion of the tire illustrated in FIG. 1.

The block elements 17 in each row 18 are all of substantially the same geometric shape, in this case the block elements 17 are "S" shaped in a front elevational view of the tire. Each block element 17 axially overlaps and interlocks with an adjacent block element or elements. For example, in FIG. 2, in row 18A the block element 17A overlaps and interlocks with the adjacent blocks 17B,17C. The blocks 17 are separated from each other by two circumferentially extending grooves 24,25 which are axially offset from each other and are interconnected by a substantially axially extending blade or sipe 26. A blade or sipe is a very narrow groove that closes in the footprint of the tire. As used herein, "substantially axially extending" means an angle of 70° to 90° with respect to the circumferential center plane of the tire. Preferably each blade 26 extends at an angle of at least 70° with respect to the circumferential center plane of the tire, and preferably at 90°. It is preferable for the ends of the circumferentially extending grooves separating block elements 24,25 to be aligned circumferentially, as shown, there being no appreciable circumferential overlapping of said grooves. No two axially extending blades separating the adjacent block elements in any given row of block elements are circumferentially aligned with one another.

The block elements in any one row 18 are arranged so that as that row extends across the tire tread portion 11 from one lateral edge 12 to the other lateral edge 13 the blades 26 separating the overlapping portions of adjacent block elements are not axially aligned with one another. This arrangement results in the block elements interlocking when they are subjected to a force applied in a circumferential direction, for example, during braking, acceleration, or cornering. When such a force is applied, a portion of each block element 17 which is circumferentially upstream of the direction of the force will be pushed back downstream and when the respective blade 26 is closed, will be supported on the downstream portion of its adjacent block element. For example, if a circumferential load is applied in the direction of arrow L, then for the block 17A, its upstream portion 30 interlocks with the block 17B, so that when the block 17A distorts under load "L" and the respective blade or sipe 26 closes, that portion of the block 17A is supported on the block 17B, and so on across the entire row 18A of block elements.

Figure 3:
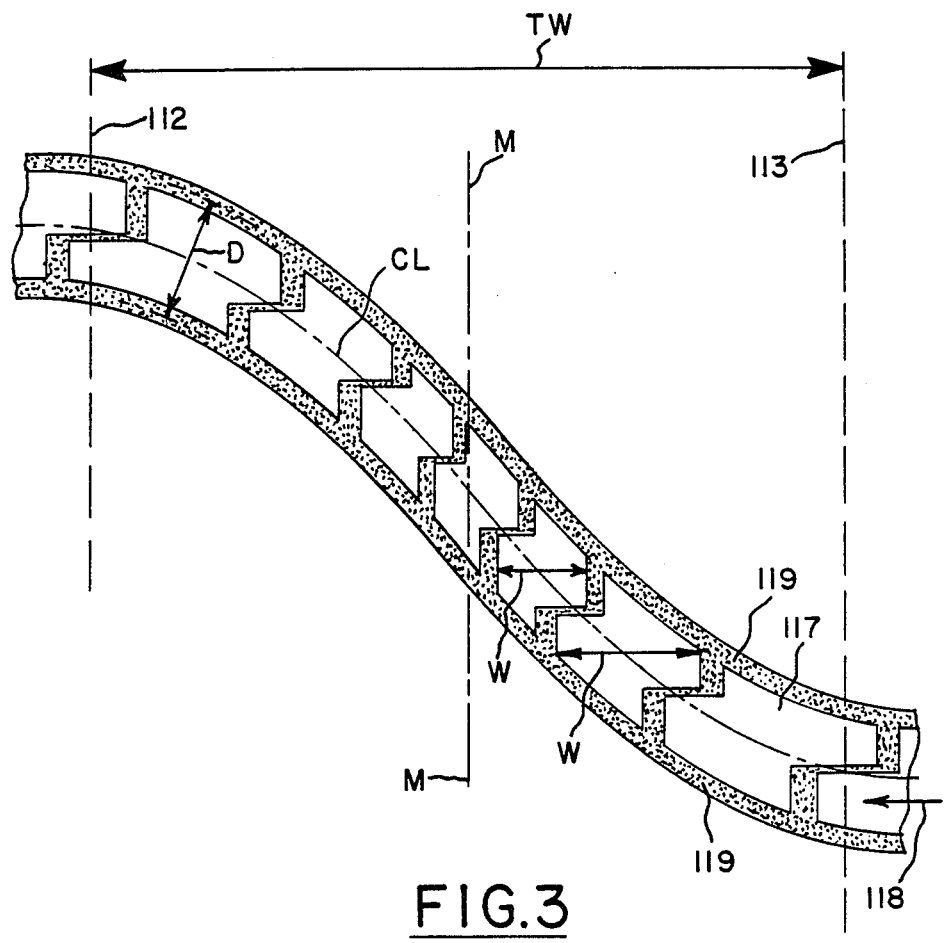
FIG. 3 is a fragmentary plan view illustrating a row of block elements in a tire according to a second embodiment of this invention.

With reference now to FIG. 3, there is illustrated a second embodiment of the invention showing a row 118 of block elements 117 extending across a tread portion 111 of a tire between the lateral edges 112,113 of the tread. In this embodiment, the lateral grooves 119 have a "Z" shaped configuration and the block elements 117 have an increasing axial width W with increasing displacement of the respective block element from the center plane M—M of the tire. Furthermore, the distance D between adjacent lateral grooves 119 increases slightly as the distance from the center plane M—M increases, the distance D between adjacent lateral grooves being measured normal to the center line CL of the row 118 between the grooves and between the center lines of the two grooves.

Figure 4:
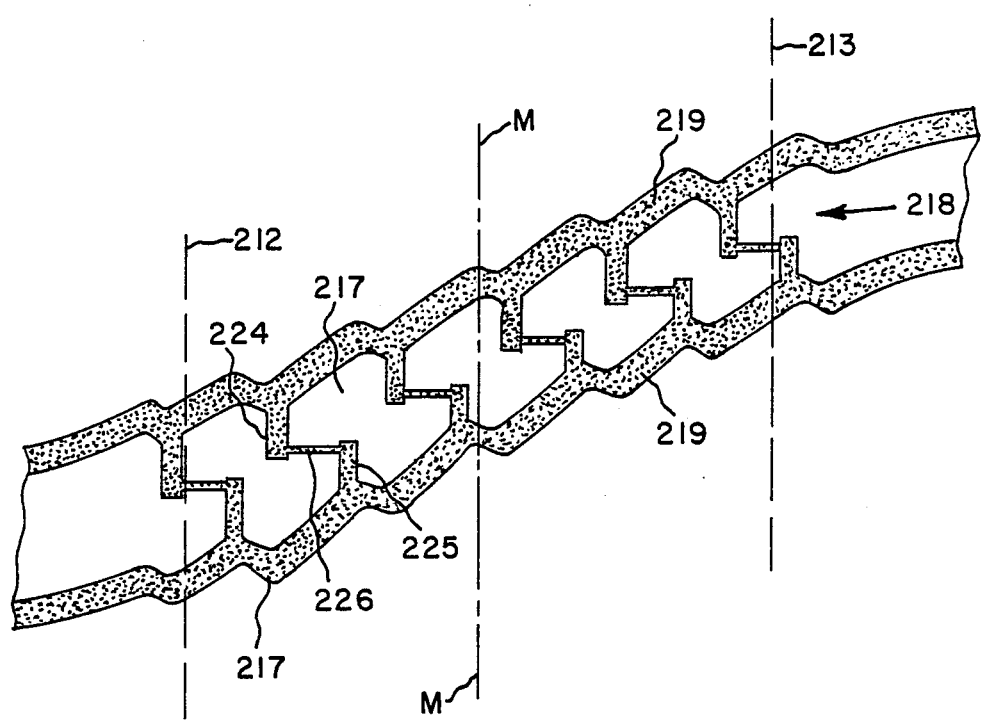
FIG. 4 is a fragmentary view illustrating a row of block elements according to a third embodiment of the present invention.

With respect to FIG. 4 there is illustrated a third embodiment of the invention showing a row 218 of block elements 217 extending across a tread portion of a tire between lateral edges 212,213. The rows of block elements 218 are separated by lateral grooves 219. In this embodiment the lateral grooves 219 are in the form of zig-zag grooves extending in a generally diagonal direction across the tread. The block elements 217 are of a substantially "Z" shape and the two circumferential grooves 224,225 separating adjacent block elements circumferentially overlap. A blade 226 links the pair of circumferential grooves 224,225 separating adjacent block elements.

Figure 5:
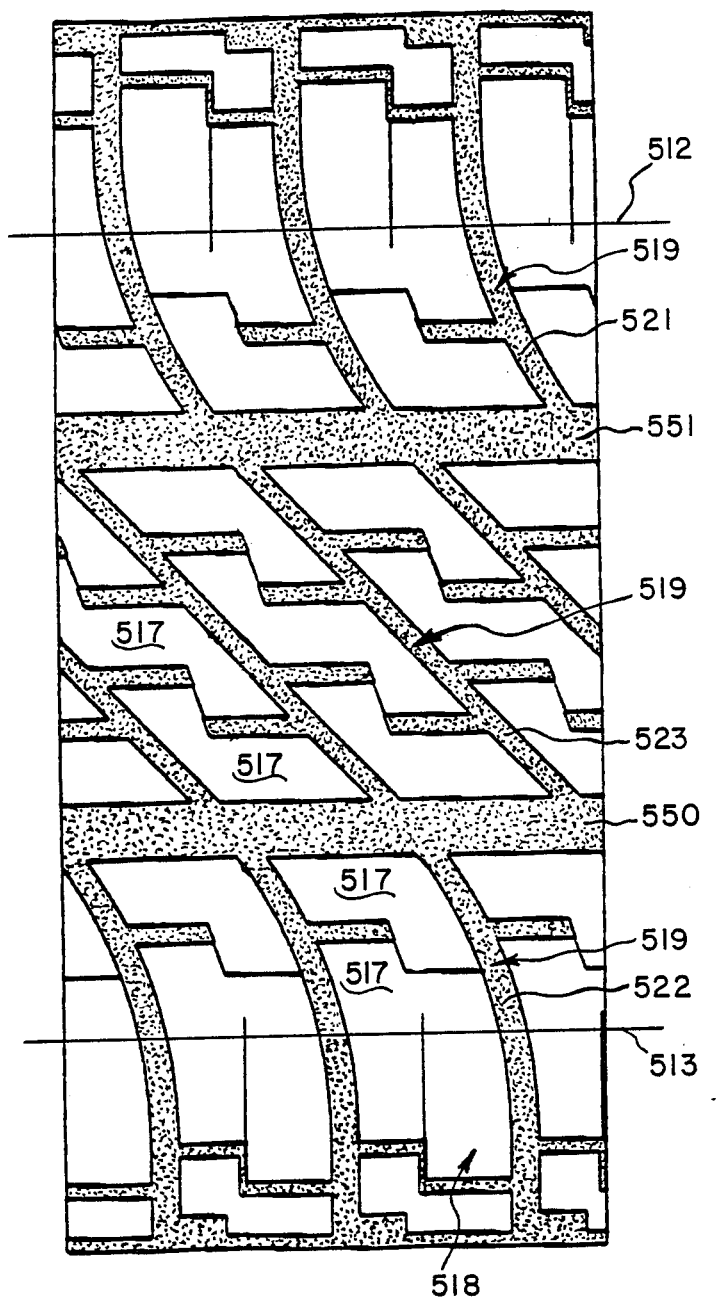
FIG. 5 is a fragmentary plan view of a tire tread according to a fourth embodiment of the invention.

Referring next to FIG. 5, there is shown a fragmentary plan view of the tread portion of a tire according to another embodiment of the invention. This preferred embodiment has transverse grooves 519 extending between the tread edges 512,513 with curved portions 521,522 and a straight portion 523 as already described with respect to FIGS. 1 and 2. The rows 518 of block elements 517 are substantially the same as those shown and described with respect to the embodiment in FIGS. 1 and 2. However in this embodiment the rows 518 of block elements 517 are interrupted by grooves 550,551 that extend circumferentially around the tread portion of the tire, with these circumferential grooves having a width such that they do not close up in a footprint of the tire. These circumferential grooves could be employed in any of the embodiments described herein.

Applicant has discovered that it can be advantageous to provide additional circumferential grooves in the shoulder of the tread in order to further improve the properties of the tire on wet roads. This can be particularly advantageous in so-called low aspect ratio tires, i.e. in tires with a cross section having a height to width ratio which is smaller than about 0.65.

Figure 6:
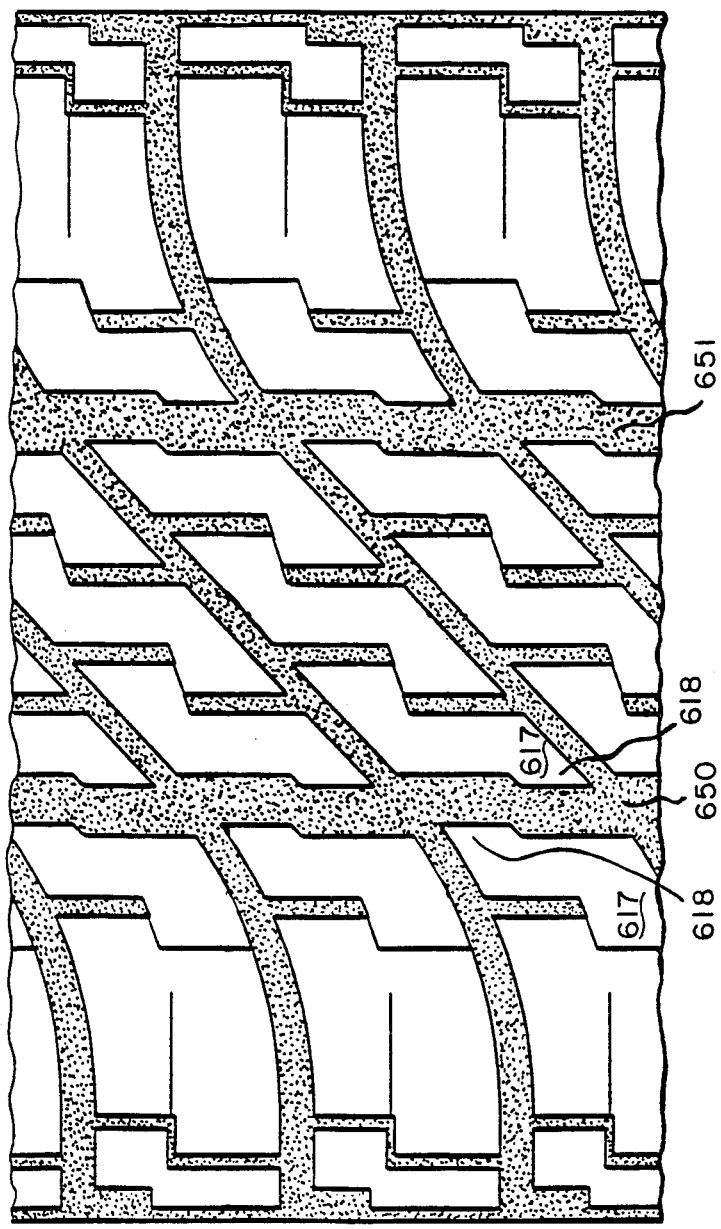
FIG. 6 is a fragmentary plan view of a tire tread according to a fifth embodiment of the invention.

FIG. 6 illustrates a fragmentary plan view of a tread portion of a tire which is a further improved embodiment of the tread portion shown in FIG. 5. The block elements 617 which are adjacent to the circumferential grooves 650,651 comprises parallelogram shaped end portions 618 which protrude into the circumferential grooves 650,651. While the volume of the circumferential grooves in the embodiment of FIG. 6 is substantially unchanged as compared to the embodiment on FIG. 5, the additional transversal edges of the parallelogram shaped end portions 618 further improve the traction and the braking properties of the tire. Preferably, the parallelogram shaped end portions have two acute angles and two obtuse angles.

While the invention has been described with reference to the examples shown in the accompanying drawings it will be evident that persons skilled in the art may make minor alterations without departing from the spirit and scope of the invention.

I claim:

1. A pneumatic tire having a ground contacting tread portion comprising a plurality of block elements which are disposed in rows separated by lateral grooves extending transversely across the tread from one lateral edge of the tread to another lateral edge of the tread, characterized in that in each row each block axially overlaps an adjacent block and the overlapping portions of adjacent blocks are separated by substantially axially extending blades, no two of said blades separating adjacent block elements in any row being circumferentially aligned with one another.

2. A pneumatic tire as claimed in claim 1 wherein the lateral grooves each have a linear portion which traverses the circumferential center plane of the tread at an angle of at least 30°.

3. A pneumatic tire as claimed in claim 2 wherein each lateral groove is oriented at an angle of at least 60° with a plane parallel to said mid-circumferential plane at each lateral edge of the tread.

4. A pneumatic tire as claimed in claim 3 wherein each lateral groove has curved portions adjacent each lateral edge of the tread and which extend in circumferentially opposite directions so that each groove has a substantially "S" or "Z" shaped configuration.

5. A pneumatic tire as claimed in claim 1 wherein each block element is separated from an adjacent block element by two axially off-set, circumferentially extending grooves linked by said axially extending blade.

6. A pneumatic tire as claimed in claim 5 wherein the ends of the circumferentially extending grooves separating adjacent blocks are circumferentially aligned with one another.

7. A pneumatic tire as claimed in claim 5 wherein the circumferentially extending grooves separating adjacent blocks are in a circumferentially overlapping relationship.

8. A pneumatic tire as claimed in claim 1 wherein the block elements in each row have an increasing axial width with increasing displacement of a respective block element from the center plane of the tread portion.

9. A pneumatic tire as claimed in any one of claims 1-8 wherein the rows of block elements are interrupted by grooves that extend circumferentially around the tread portion of the tire.

10. A pneumatic tire as claimed in claim 9 wherein the blocks adjacent to the circumferentially extending grooves have parallelogram shaped end portions which protrude into the circumferentially extending grooves.

* * * * *